United States Patent [19]

Rannenberg

[11] 4,245,964
[45] Jan. 20, 1981

[54] EFFICIENCY FLUID PUMPING SYSTEM INCLUDING SEQUENTIAL UNLOADING OF A PLURALITY OF PUMPS BY A SINGLE PRESSURE RESPONSIVE CONTROL VALVE

[75] Inventor: George C. Rannenberg, Canton, Conn.

[73] Assignee: United Technologies Corporation, Hartford, Conn.

[21] Appl. No.: 959,036

[22] Filed: Nov. 8, 1978

[51] Int. Cl.³ .............................................. F04B 49/08
[52] U.S. Cl. ..................................... 417/287; 417/288
[58] Field of Search ........................ 417/288, 287, 286

[56] References Cited

U.S. PATENT DOCUMENTS

| | | | |
|---|---|---|---|
| 1,982,711 | 12/1934 | Vickers | 417/287 X |
| 2,247,261 | 6/1941 | Towler et al. | 417/288 |
| 2,617,361 | 11/1952 | Neal | 417/288 |
| 2,898,737 | 8/1959 | Rockwell | 417/287 X |
| 3,026,929 | 3/1962 | Burns | 417/286 X |

FOREIGN PATENT DOCUMENTS 484079  6/1952  Canada .................................... 417/287

*Primary Examiner*—Richard E. Gluck
*Attorney, Agent, or Firm*—Donald F. Bradley; John Swiatocha

[57] ABSTRACT

In a fluid pumping system in which a fluid is pumped from a fluid supply to a load, two continuously driven fixed displacement pumps are operated in parallel to provide the pumping action. The two pumps are arranged with a common inlet, and with a common outlet, the flow delivered to the load from one of the two pumps passing through a check valve upstream of the common outlet. The fluid flow is regulated to provide a constant pressure by sequentially bypassing fluid around each pump through separate pump bypass ducts. This sequential fluid bypassing or pump unloading is effected by a single control responsive to the flow requirements of the load necessary to maintain that constant pressure. The pump whose delivered flow outlet contains the check valve is the pump whose flow is bypassed initially when less than full pumping capacity is desired. During maximum flow demand operation, both pumps are delivering against full delivery pressure. During low flow demand operation only the pump without the check valve delivers against full pressure, the other pump being operated with essentially no pressure load. In a preferred embodiment the pump which contains the check valve is of considerably larger displacement than the other pump. The result is a pumping system with significantly reduced pump input power during periods of low flow demand.

15 Claims, 6 Drawing Figures

EFFICIENCY FLUID PUMPING SYSTEM INCLUDING SEQUENTIAL UNLOADING OF A PLURALITY OF PUMPS BY A SINGLE PRESSURE RESPONSIVE CONTROL VALVE

BACKGROUND OF THE INVENTION

1. Field of the Invention

This invention relates to fluid pumping systems in which either a constant delivery pressure or a constant flow is maintained by modulation of two bypass valves in sequence. Two constant displacement pumps are used during periods of maximum supply demand, with one pump essentially being bypassed during periods of low flow demand. The fluid pumping systems applicable to this invention include those which pump hydraulic fluid for operation of remote actuators, as well as fuel pump systems delivering fuel to engines. The invention may be used to supply pressurized fluid directly to a load, or may be used with an accumulator to reduce the maximum transient pumping capacity required.

2. Description of the Prior Art

In the past, pumping systems which used a single fixed displacement pump have regulated capacity and flow by means of an associated bypass valve. Such systems are highly ineffecient at low delivered flow. With this prior art system pump, input power is constant regardless of delivered flow for any given delivery pressure.

In an attempt to improve the low efficiency of the above-described prior art system, variable displacement pumps have been developed. The efficiency of such pumps is highly improved, but at the price of increased complexity, increased cost and reduced reliability.

The present invention is a considerable improvement over the prior art pumping systems in that it utilizes two simple fixed displacement pumps in parallel hydraulically, and by a unique bypass arrangement achieves an efficiency at low flows close to that of a variable geometry pump, while maintaining to a considerably degree the simplicity, reliability and low cost advantages of the single fixed geometry pump.

It is therefore an object of this invention to provide a fluid pumping system with significantly reduced pump input power during periods of low flow demand.

Another object of the present invention is a fluid pumping system which uses two continuously driven fixed displacement pumps operating in parallel hydraulically, the delivered flow from one of the pumps being bypassed completely during periods of low flow demand.

A further object of this invention is a fluid pumping system which automatically bypasses unneeded flow as a function of pressure or flow demand to reduce the pumping requirements and input power.

SUMMARY OF THE INVENTION

In accordance with the present invention there is provided a fluid pumping system which receives fluid from a low pressure source and delivers it to a load at a higher pressure using power provided from a rotating shaft. A dual pumping assembly is utilized which consists of two positive displacement, fixed displacement pumps having a common pump inlet, the pumped fluid passing through each of the pumps in parallel. The fluid delivered to the load by the first pump also passes through a check valve before it joins the flow delivered by the second pump to provide the combined delivered flow output of the dual pump assembly. In response to a need for reduced delivered flow volume, a first bypass valve opens to bypass the flow from the first or cycling pump upstream of the check valve, and returns the bypassed fluid to the common pump inlet. If even less delivered flow is required, a second bypass valve is automatically opened, the second bypass valve being associated with the second or continuous pump, to bypass the load with fluid taken from the second pump upstream of the junction of the delivered flow from the two pumps, this bypass fluid being returned to the common pump inlet. At minimum flow, there is practically no pressure rise across the first pump, considerably reducing the required input power. The delivered fluid flow is then produced entirely by the second pump. If the first pump is made larger in displacement than the second pump, even greater savings in power can be realized.

BRIEF DESCRIPTION OF THE DRAWINGS

FIG. 2 is a schematic drawing of an alternate embodiment of the present invention in which the pumping system is controlled to provide a desired flow by maintaining a fixed pressure drop across a metering orifice to provide fuel to a gas turbine engine or the like.

DESCRIPTION OF THE PREFERRED EMBODIMENT

Figure 1:
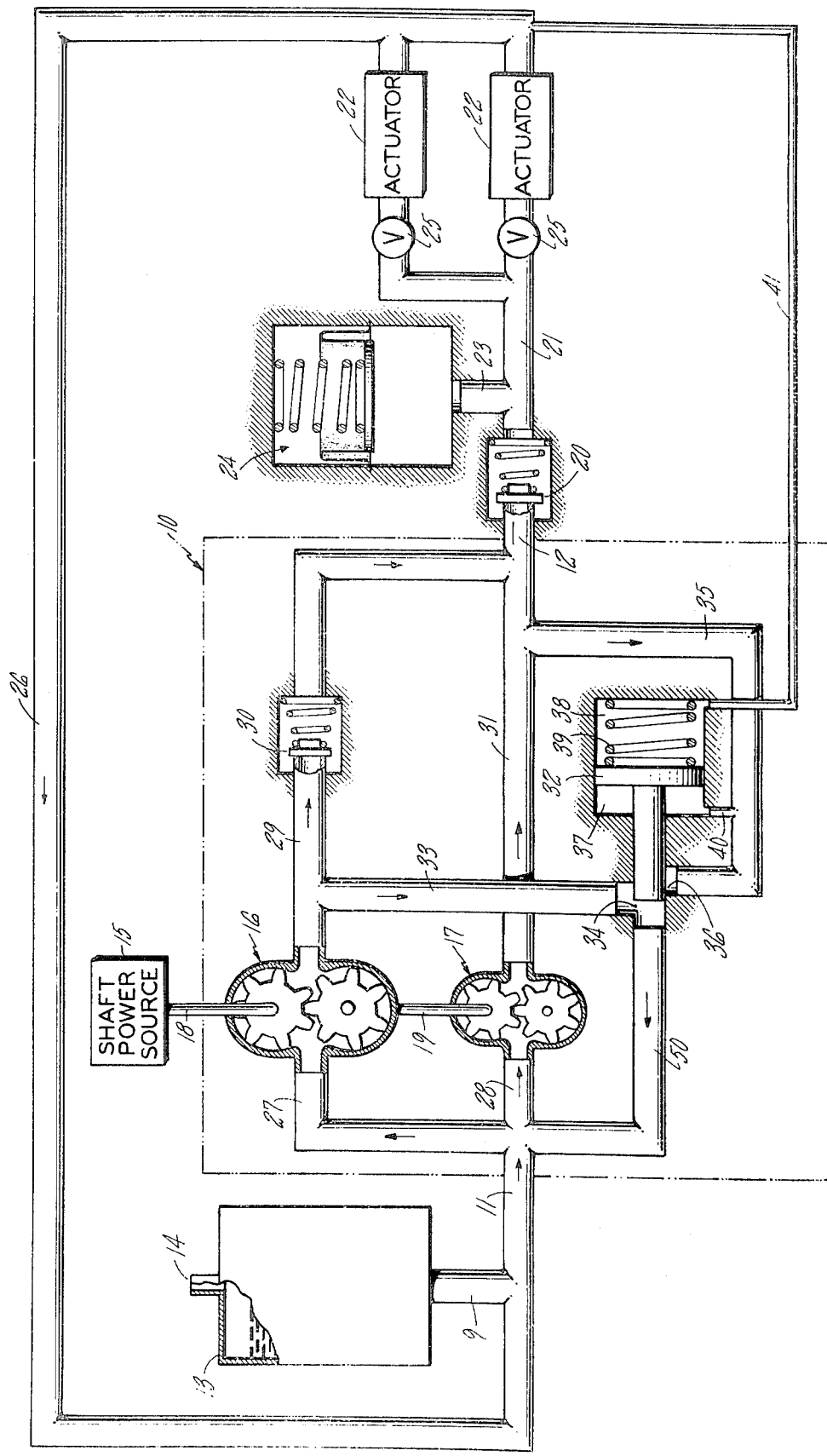
FIG. 1 is a schematic drawing of a preferred embodiment of this invention showing the pumping system controlled to provide a desired pump delivery pressure for operation of remote actuators.
Figure 2:
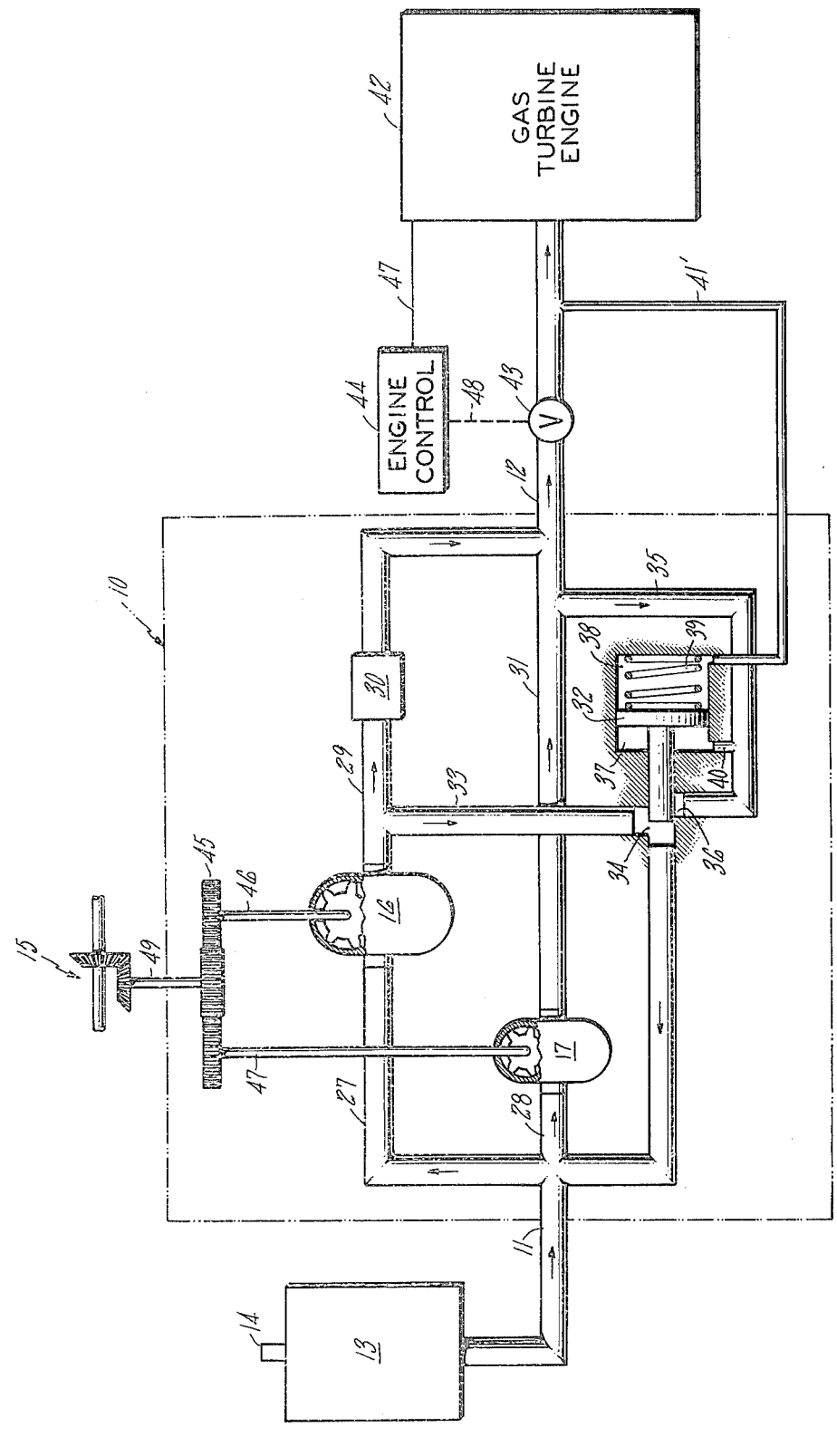

FIGS. 1 and 2 show schematically alternate embodiments of the invention, FIG. 1 being directed to a fluid pumping system which will supply fluid at a desired delivery pressure, whereas FIG. 2 shows an embodiment which delivers a desired volume flow of fluid. While there are minor differences in the implementation between FIGS. 1 and 2, the essential elements of the invention are common to both Figures. Similar elements in FIGS. 1 and 2 will be referred to by the same reference numerals.

With respect to both FIGS. 1 and 2, the elements essential to practicing the invention include a fluid source, two shaft-driven fixed displacement pumps hydraulically in parallel, a delivery sink or outlet duct for accepting fluid from the source which has been raised to a higher pressure by the pumps, and a control means for modulating the amount of flow delivered to the load by the pumping system. The novel elements of the invention are enclosed within the dotted lines and shown as reference numeral 10, this portion being referred to as the fluid pumping system. The remainder of the elements in FIGS. 1 and 2 are standard components well known to those skilled in the art.

The fluid pumping system 10 is located between the fluid input or supply pipe 11 and the fluid output or delivery pipe 12. Fluid is maintained in the fluid supply pipe 11 via line 9 by reservoir 13 which is vented to atmosphere as shown by reference numeral 14. The fluid pumping system 10 is powered by the block 15 labeled shaft power source. Any other standard source of power may also be used. The two pumps in the pumping system 10, denoted by reference numerals 16 and 17, are driven by interconnecting shafts 18 and 19 connected with shaft power source 15. Pump 16 will be denoted the first or cycling pump, and pump 17 will be denoted the second or continuous pump.

At the outlet end of the pumping system 10, fluid supplied by delivery pipe 12 passes through check valve 20 and then via pipe 21 to a load represented by actuators 22. A part of the fluid also passes via pipe 23 into accumulator 24. The check valve 20 is used to prevent loss of delivery pressure from the accumulator 24. The actuators 22 represent the load of the fluid system, although it is understood that the load might consist of a wide variety of well known hydraulically powered devices. Regulating valves 25 may be placed in series with each actuator to control the amount of fluid into each of the actuators. Fluid returning from the actuators 22 is fed via pipe 26 to the fluid supply.

Figure 4:
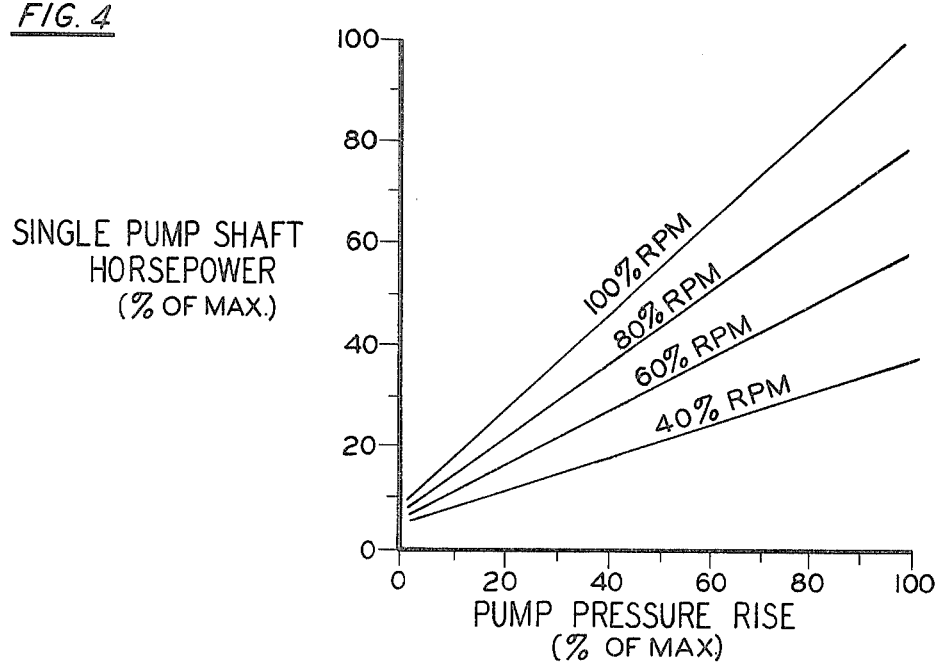
FIG. 4 shows graphically the performance characteristics of typical fixed displacement fluid pumps as utilized in FIGS. 1 and 2.

With reference to the fluid pumping system 10, the fluid supply pipe 11 is split into two pump inlet pipes 27 and 28. Pipe 27 feeds fluid to the first constant displacement pump 16, while pipe 28 feeds fluid to the second constant displacement pump 17. The pumps 16 and 17 are of the type well known in the art with characteristics as shown in FIG. 4. FIG. 4 shows typical fuel pump shaft horsepower plotted against pump pressure rise as a function of pump speed, thereby showing the performance characteristics of a typical fixed displacement pump.

Assuming maximum flow and/or pressure from both pumps, the fluid delivered from pump 16 passes through a pipe 29 and a check valve 30 into outlet pipe 12, while the fluid delivered from pump 17 passes through a pipe 31 into outlet pipe 12. An inportant feature of the present invention is a pump bypass control means comprising a valve assembly 32 which permits the flow from the pumps 16 and 17 to be bypassed by virtue of the opening of certain valve port areas to be described subsequently.

In its fully closed position, that is, when the bypass valve assembly 32 is at its farthermost position to the left, a bypass line 33, which connects with pipe 29, and corresponding bypass port 34 in line 33, are closed and no fluid passes therethrough. Likewise, when the bypass valve assembly 32 is fully closed, a bypass line 35 connected with pipe 31 and corresponding bypass port 36 are also closed and no fluid passes therethrough.

Bypass valve assembly 32 is controlled by the pressure difference between chambers 37 and 38 acting against a spring 39. As noted previously, the embodiment of FIG. 1 utilizes the fluid pumping system 10 to provide a fixed supply pressure for actuators 22 forming the load. This mode of control is provided by connecting chamber 37 via a line 40 to the delivered fluid pressure of delivery pipe 12 which is essentially the same pressure contained in line 35, and by interconnecting chamber 38 via a line 41 to the fluid return pressure in line 26, the fluid return pressure in this case being essentially atomospheric pressure due to the vent 14 to atmosphere of reservoir 13. When the delivered fluid pressure in outlet pipe 12 exceeds the value determined by the force of spring 39, the valve assembly 32 will move to the right and gradually open bypass ports 34 and 36 in a sequential manner to be described in conjunction with FIG. 3, and thus maintain a fixed fluid delivery pressure. In a like manner, a low delivery supply pressure at outlet pipe 12 will cause bypass ports 34 and 36 to close. In FIG. 1, the bypass valve assembly 32 and port 34 are shown in a partially open position.

When full pump output is desired, both pump bypass ports 34 and 36 are closed. The full delivered flow from pump 16 passes through line 29 and check valve 30 where it is ducted together with the full delivered flow from pump 17 passing through line 31 to become the delivered flow of the pump system at outlet pipe 12. As less delivered flow is needed, valve assembly 32 starts to open port 34 so that an increasing portion of the flow from first pump 16 is ducted via line 33, port 34 and line 50 back to the common inlet 11 of the pumps. When port 34 opens far enough so that the discharge pressure of first pump 16 is less than the discharge pressure of second pump 17, the check valve 30 shuts and at that point the entire flow from pump 16 is bypassed. When even less delivered flow is desired, port 36 begins to open to bypass the appropriate portion of the fluid flow from second pump 17 via bypass line 35 and line 50 to common inlet 11.

Figure 3:
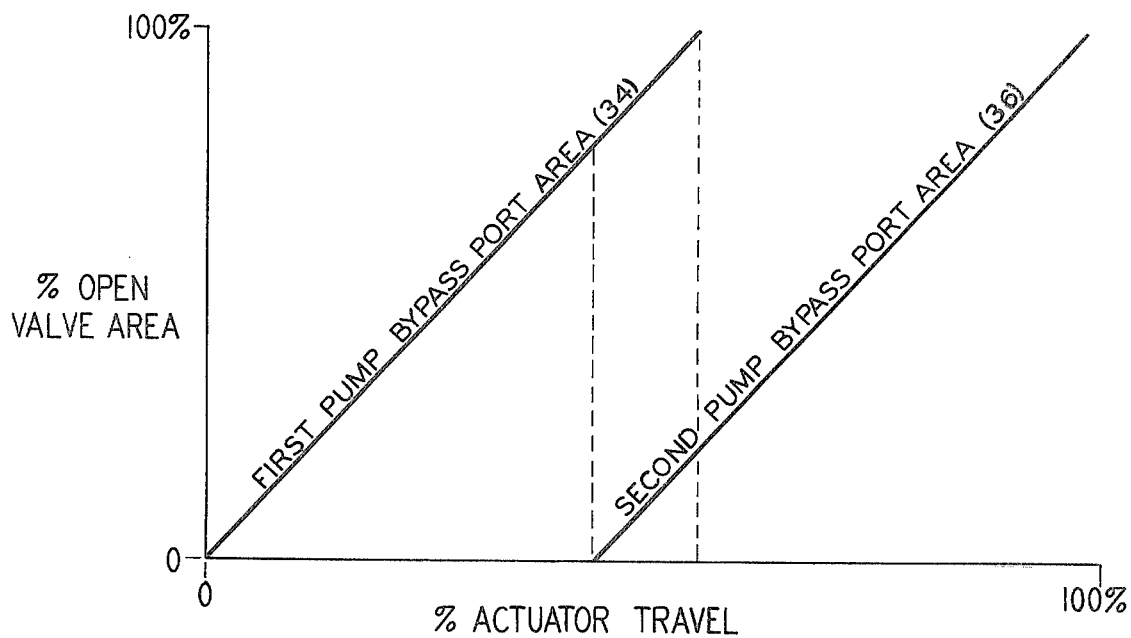
FIG. 3 is a graphical showing of a typical actuator travel versus valve area schedule for the pump bypass valves of FIGS. 1 and 2.

FIG. 3 shows in graph form the sequence of operation during the opening of bypass ports 34 and 36 by virtue of the travel of valve assembly 32. Initially as the valve actuator 32 moves to the right, the port area 34 opens a greater amount. However, before bypass port area 34 is fully open, bypass port area 36 begins to open, and there is a position of valve actuator 32 shown between the dotted lines in FIG. 3 in which both port areas 34 and 36 are opened. This may be seen by reference to the construction of the valve 32 and the ports 34 and 36 in FIG. 1. Alternately, two different valves may be provided, one in each of the lines bypass lines 33 and 35, with two separate control means, but the principle of operation remains the same.

It should be noted that first pump 16 is cycled according to flow demand. When the output from pump 16 is not required, it recirculates pump flow with essentially zero pressure rise across the pump, and therefore at very low power absorption. Pump 17 is never cycled, but rather continuously operates with full pressure rise across the pump. By making the pump which cycles first pump 16, larger in displacement than the continuously operating second pump 17, the power requirement at shaft 18 is significantly reduced at low delivery flows. This is shown more specifically in FIGS. 5 and 6.

Figure 5:
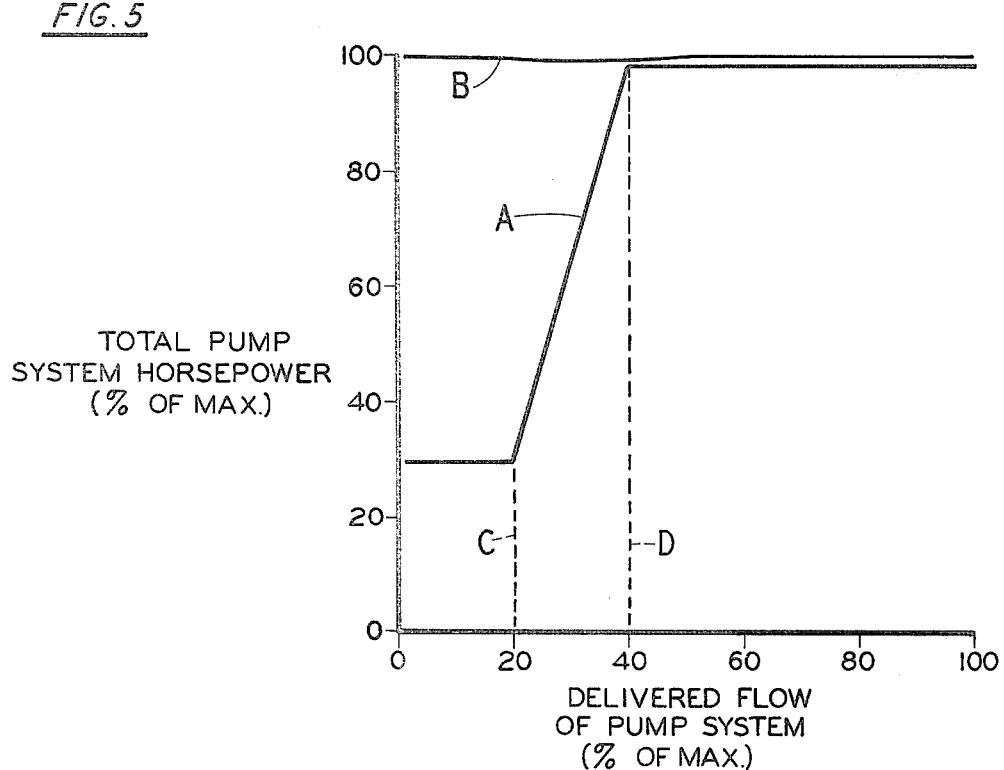
FIG. 5 is a graph showing the power consumed by the pumping system of this invention as opposed to prior art systems.

With respect to FIG. 5, there is plotted the percentage of total pump system horsepower as a function of the percentage of delivered flow of the pump system. Line A shows the horsepower requirements of the present invention as opposed to line B which shows the horsepower requirements of the prior art single fixed displacement pump system. Dotted line C shows the point at which the cycled pump 16 bypass port area 34 is fully opened as a percentage of delivered flow. Dotted line D shows the percentage of delivered flow at which the check valve 30 closes.

Figure 6:
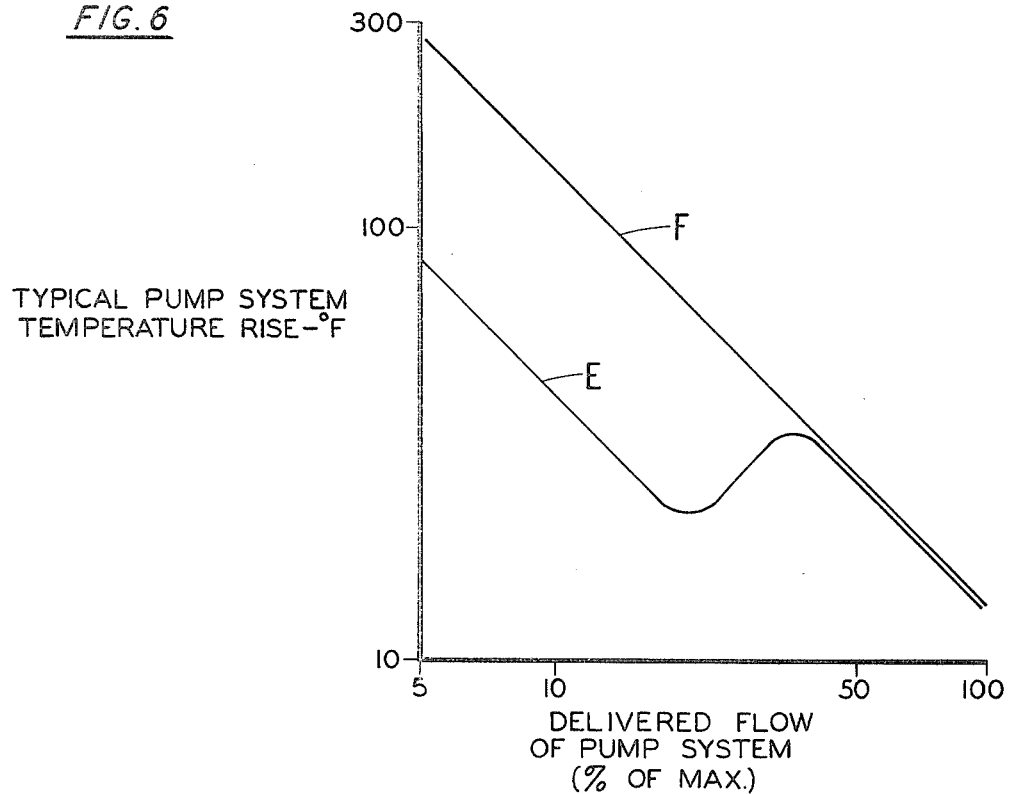
FIG. 6 is a graph showing the temperature rise of the pumped fluid when using the present invention as opposed to the prior art.

With respect to FIG. 6 there is shown a plot of typical pumping system temperature rise in degrees farenheit using kerosene raised 1700 psi versus the percent of delivered flow of the pumping system. Line E shows the curve for the pumping system of the present invention, while curve F shows a much higher temperature rise for the prior art single fixed displacement pump system.

FIG. 2 shows an alternate embodiment of the invention in which the fluid pumping system delivers a desired volume flow of fluid. This embodiment is identical to that of FIG. 1 insofar as the fluid pumping system 10 is concerned. All elements are the same except that the pumps 16 and 17 are driven by shaft power source 15, shaft 49, gears 45 and shafts 46 and 47. Furthermore, the control concept of the two implementations is the same except that in the embodiment of FIG. 1 the pumping system is controlled to provide a desired delivery pressure, whereas in the embodiment of FIG. 2, the pumping system is controlled to deliver a desired volume flow of fluid.

In FIG. 2 the shaft power source 15 may be the engine shaft of a gas turbine engine 42. Supply pipe 11 is maintained with fuel supplied by fuel tank 13. The pump bypass valve assembly 32 is modulated by the pressure difference between chambers 37 and 38 acting against spring 39. In the embodiment of FIG. 2, the fluid pumping system 10 is utilized to provide the flow of fuel demanded by the gas turbine engine control 44 which receives signals indicative of desired gas turbine engine fuel demand via signal line 47, and controls throttle valve 43 in response thereto via a mechanical connection shown at 48. This mode of control is provided by interconnecting chamber 37 to the delivered pressure via pipes 40 and 35 upstream of the engine fuel throttle valve 43, and by interconnecting chamber 38 to the pressure downstream of throttle valve 43 via line 41''. The pump bypass valve assembly 32 will respond to hold the pressure drop across the engine throttle valve 43 to a value determined by the force of the pump bypass valve spring 39. By maintaining the desired pressure drop across throttle valve 43, the engine control 44 can select whatever fuel flow is required to satisfy the operating conditions of the engine 42 by selection of the appropriate areas of throttle valve 43.

The operation and features of the fluid pumping system with regard to the bypassing of pumps 16 and 17 is the same as described in the embodiment of FIG. 1, that is, the embodiment in which delivered pressure is used as the control signal rather than delivered flow.

While the invention has been described in terms of preferred embodiments thereof, and showing the best mode contemplated, it is apparent that changes may be made in the arrangement and operation of components thereof without departing from the scope of the invention as hereinafter claimed.

I claim:

1. In a fluid pumping system receiving fluid from a low pressure source and delivering said fluid to a load at a higher pressure;

first and second positive displacement, fixed displacement pumps;

means for powering said pumps;

means for ducting fluid from said source to both pumps simultaneously said pumps passing the delivered flow therefrom through separate outlet ducts to a common delivered junction;

a first bypass means including a first bypass duct connected to the pump outlet of said first pump and including a first valve means therein, said first valve means being responsive to a reduction in the delivered flow requirements of said load and opening to permit excess flow from said first pump to pass through said first bypass duct to said fluid source;

and second bypass means including a second bypass duct connected to the pump outlet of said second pump and including a second valve means therein, said second valve means being responsive to a further reduction in the delivered flow requirements of said load and opening to permit excess flow from said second pump to pass through said second bypass duct to said fluid source;

said first and second valve means comprising a single actuator element responsive to a signal indicative of a predetermined outlet fluid pressure whereby actuation of said actuator element initially opens said first valve means, and whereby further actuation thereof opens said second valve means.

2. A fluid pumping system as in claim 1 and including a check valve in the delivered flow outlet duct of said first pump downstream from said first bypass duct, said check valve closing when the discharge pressure of said first pump is less than the discharge pressure of said second pump, closing of said check valve causing the entire fluid output from said first pump to pass through said first bypass duct and thereby producing an essentially zero pressure rise across said first pump.

3. A fluid pumping system as in claim 1 in which said first and second bypass ducts join at a common duct and the flow in both bypass ducts passes through said common duct into said source, the junction of said first and second bypass ducts and the location of said actuator being such as to permit said second valve means to begin opening prior to full opening of said first valve means.

4. A fluid pumping system as in claim 1 in which said means for powering said pumps include a rotating power source having drive shafts concentric to and extending from said rotating power source.

5. A fluid pumping system as in claim 1 in which said means for powering said pumps include a rotating shaft having a single gear connected therewith, and a drive shaft extending from said gear to each pump.

6. A fluid pumping system as in claim 1 in which said first pump is substantially larger in volume flow than said second pump, complete bypassing of the flow from said first pump substantially reducing the power absorption of said system, the fluid being delivered to said load only by said second pump.

7. A fluid pumping system according to claim 1 wherein said valve actuator element is operatively connected to a pair of opposed piston faces, one of said piston faces being responsive to fluid pressure upstream of said load, an opposite one of said piston faces being responsive to the fluid pressure downstream of said load whereby the positioning of said valve actuator element is responsive to the pressure drop across said load.

8. A fluid pumping system according to claim 7 wherein said load comprises a throttle valve, adjustment of said throttle valve effecting an adjustment in flow therethrough and a corresponding adjustment in position of said valve actuator element to maintain a constant pressure drop across said throttle valve whereby flow through said throttle valve may be scheduled as a function of the flow area of said throttle valve.

9. A fluid pumping system according to claim 7 wherein said valve actuator element is spring biased in the direction of valve closing, said biasing being balanced by said fluid pressures upstream and downstream of said load acting on said pair of piston faces.

10. In a fluid pumping system receiving fluid from a low pressure source and delivering said fluid to a load at a higher pressure;
- a dual pump assembly consisting of first and second positive displacement, fixed displacement pumps; each of said pumps having an inlet and an outlet and adapted to raise the pressure of fluid passing therethrough;
- means for powering said pump;
- common inlet duct means dividing into first and second inlet ducts connected respectively to the inlets of said first and second pumps for delivering low pressure fluid thereto;
- outlet duct means including first and second outlet ducts connected respectively to the outlets of said first and second pumps, said first and second outlet ducts joining to form a common outlet duct for delivering high pressure fluid to said load;
- a check valve connected in said first outlet duct and adapted to close blocking flow therethrough when the first discharge pressure of said second pump exceeds that of said first pump;
- a first bypass duct connected with said first outlet duct between the outlet of said first pump and said check valve and adapted to bypass fluid from said first outlet duct back to said common inlet duct means;
- a second bypass duct connected to said second outlet duct and adapted to bypass fluid from said second outlet duct back to said common inlet duct means; and
- normally closed valve means comprising a single valve element responsive to the fluid pressure drop across said load and connected in said first and second bypass ducts, said valve element being adapted to open said first and second bypass ducts in a predetermined sequence to adjust the flow of the fluid at said common outlet duct as fluid demand is reduced from its maximum value.

11. A fluid pumping system as in claim 10 in which said valve element is adapted to open said first bypass duct prior to opening said second bypass duct, said check valve being closed upon the opening of said first bypass duct to cause the entire output flow from said first pump to be bypassed to said common inlet duct means.

12. A fluid pumping system as in claim 10 in which the fluid displacement of said first pump is larger than that of said second pump.

13. A fluid pumping system according to claim 10 wherein said valve element is operatively connected to a pair of opposed piston faces, one of said faces being responsive to fluid pressure upstream of said load, an opposite one of said faces being responsive to fluid pressure downstream of said load.

14. A fluid pumping system according to claim 13 wherein said load comprises a throttle valve, adjustment of said throttle valve effecting an adjustment in flow therethrough and a corresponding adjustment in position of said valve element to maintain a constant pressure drop across said throttle valve whereby flow through said throttle valve may be scheduled as a function of the flow area of said valve.

15. A fluid pumping system according to claim 13 wherein said valve element is spring biased in the direction of valve closing, said biasing being balanced by said fluid pressure upstream and downstream of said load acting on said pair of piston faces.

* * * * *